US012565138B2

(12) United States Patent
Dieter

(10) Patent No.: US 12,565,138 B2
(45) Date of Patent: Mar. 3, 2026

(54) ADAPTIVE HEADLIGHT BEAM

(71) Applicant: GM Global Technology Operations LLC, Detroit, MI (US)

(72) Inventor: Elke Dieter, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 433 days.

(21) Appl. No.: 18/181,745

(22) Filed: Mar. 10, 2023

(65) Prior Publication Data

US 2024/0300404 A1 Sep. 12, 2024

(51) Int. Cl.
B60Q 1/14 (2006.01)
H05B 47/125 (2020.01)

(52) U.S. Cl.
CPC ........... B60Q 1/143 (2013.01); H05B 47/125 (2020.01); *B60Q 2300/054* (2013.01)

(58) Field of Classification Search
CPC ............... H05B 47/115; H05B 47/125; H05B 47/1985; B60Q 1/143; B60Q 1/1407; B60Q 1/1423; B60Q 2300/054; B60Q 2300/314
See application file for complete search history.

(56) References Cited

U.S. PATENT DOCUMENTS

| | | | | |
|---|---|---|---|---|
| 10,878,769 B2 * | 12/2020 | Chang | ..................... | G02F 1/163 |
| 11,318,878 B2 * | 5/2022 | Unterweger | ....... | H05B 47/1985 |
| 2019/0128497 A1 | 5/2019 | Tessnow et al. | | |
| 2020/0079280 A1 * | 3/2020 | Bonne | .................... | B60Q 1/143 |
| 2021/0354619 A1 * | 11/2021 | Mimoun | ................ | B60Q 1/143 |
| 2022/0166958 A1 * | 5/2022 | Hoshino | ................ | H04N 23/60 |
| 2023/0382289 A1 * | 11/2023 | Watano | .................. | H04N 23/61 |
| 2024/0102628 A1 | 3/2024 | Bhutani et al. | | |
| 2025/0020455 A1 * | 1/2025 | Osswald | ............ | G01B 11/2513 |

OTHER PUBLICATIONS

German Office Action for German Application No. 102023126860. 0; dated Jul. 25, 2025; 5 pages.

* cited by examiner

*Primary Examiner* — Tung X Le
(74) *Attorney, Agent, or Firm* — CANTOR COLBURN LLP

(57) ABSTRACT

A vehicle, headlight system and method of operating the headlight. The headlight system includes a headlight, a sensor configured to obtain an image of an object, and a processor. The processor is configured to determine a projection of the object within the headlight, identify a pixel having a portion thereof within the projection, and turn off the pixel to reduce glare from the headlight at the object.

20 Claims, 10 Drawing Sheets

ADAPTIVE HEADLIGHT BEAM

INTRODUCTION

The subject disclosure relates to the operation of adaptive headlights on a vehicle and, in particular, to a system and method for operating pixels of an adaptive headlight to reduce the occurrence of glare at objects in an illumination area of the headlight.

New headlights for vehicles are being manufactured that include an array of pixelated light sources (e.g., light emitting diodes) that can be turned on and off individually. The higher the headlight is placed on a host vehicle, the greater the field of view that the headlight can illuminate for the host vehicle. One issue with any headlight, particular with a high beam of the headlight, is that it can produce glare in the eyes of a driver or passenger of another vehicle, possibly affecting ability of the driver to operate the other vehicle. This glare is more pronounced the higher the headlight is set on the host vehicle. Accordingly, it is desirable to provide a headlight system and method of operation for a pixelated headlight that reduces glare at remote objects while illuminating a roadway sufficiently for operation of the host vehicle.

SUMMARY

In one exemplary embodiment, a method of operating a headlight of a vehicle is disclosed. A sensor obtains a image of an object. A processor determines a projection of the object within the headlight, identifies a pixel having a portion thereof within the projection, and turns off the pixel to reduce glare from the headlight at the object.

In addition to one or more of the features described herein, the headlight includes an array of pixels and a low beam cutoff separates the array into a high beam region and a low beam region, the method further including adjusting a height of the low beam cutoff to place the projection above the low beam cutoff. Adjusting the height of the low beam cutoff further includes rotating the headlight along an axis. Turning off the pixel further includes turning off a vertical pixel and a single-row pixel at a same lateral position of the headlight as the projection. The method further includes determining a vertical gap between a bottom of the projection and a low beam cutoff and turning on the single-row pixel within the vertical gap. The method further includes turning on the single-row pixel within the vertical gap when a distance between the object and the vehicle is greater than a down aim road distance of the headlight and turning off the single-row pixel within the vertical gap when the distance is less than the down aim road distance. In an embodiment in which the object comprises a first object and a second object, the method further includes determining a first projection for the first object and a second projection for the second object, turning off a first pixel to produce a first non-glare region for the first projection and turning off a second pixel to produce a second non-glare region for the second projection.

In another exemplary embodiment, a headlight system for a vehicle is disclosed. The headlight system includes a sensor configured to obtain an image of an object, and a processor. The processor is configured to determine a projection of the object within a headlight, identify a pixel having a portion thereof within the projection, and turn off the pixel to reduce glare from the headlight at the object.

In addition to one or more of the features described herein, the headlight includes an array of pixels and a low beam cutoff separates the array into a high beam region and a low beam region and the processor is further configured to adjust a height of the low beam cutoff to place the projection above the low beam cutoff. The processor is further configured to adjust the height of the low beam cutoff by rotating the headlight along an axis. The processor is further configured to turn off a vertical pixel and a single-row pixel at a same lateral position of the headlight as the projection. The processor is further configured to determine a vertical gap between a bottom of the projection and a low beam cutoff and turn on the single-row pixel within the vertical gap. The processor further configured to turn on the single-row pixel within the vertical gap when a distance between the object and the vehicle is greater than a down aim road distance of the headlight and turn off the single-row pixel within the vertical gap when the distance is less than the down aim road distance. In an embodiment in which the object includes a first object and a second object, the processor is further configured to determine a first projection for the first object and a second projection for the second object, turn off a first pixel to produce a first non-glare region for the first projection and turn off a second pixel to produce a second non-glare region for the second projection.

In yet another exemplary embodiment, a vehicle is disclosed. The vehicle includes a headlight, a sensor configured to obtain an image of an object, and a processor. The processor is configured to determine a projection of the object within the headlight, identify a pixel having a portion thereof within the projection, and turn off the pixel to reduce glare from the headlight at the object.

In addition to one or more of the features described herein, the headlight includes an array of pixels and a low beam cutoff separates the array into a high beam region and a low beam region and the processor is further configured to adjust a height of the low beam cutoff to place the projection above the low beam cutoff. The processor is further configured to adjust the height of the low beam cutoff by rotating the headlight along an axis. The processor is further configured to turn off a vertical pixel and a single-row pixel at a same lateral position of the headlight as the projection. The processor is further configured to determine a vertical gap between a bottom of the projection and a low beam cutoff and turn on the single-row pixel within the vertical gap when a distance between the object and the vehicle is greater than a down aim road distance of the headlight. In an embodiment in which the object includes a first object and a second object, the processor is further configured to determine a first projection for the first object and a second projection for the second object, turn off a first pixel to produce a first non-glare region for the first projection and turn off a second pixel to produce a second non-glare region for the second projection.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figures 1, 2:
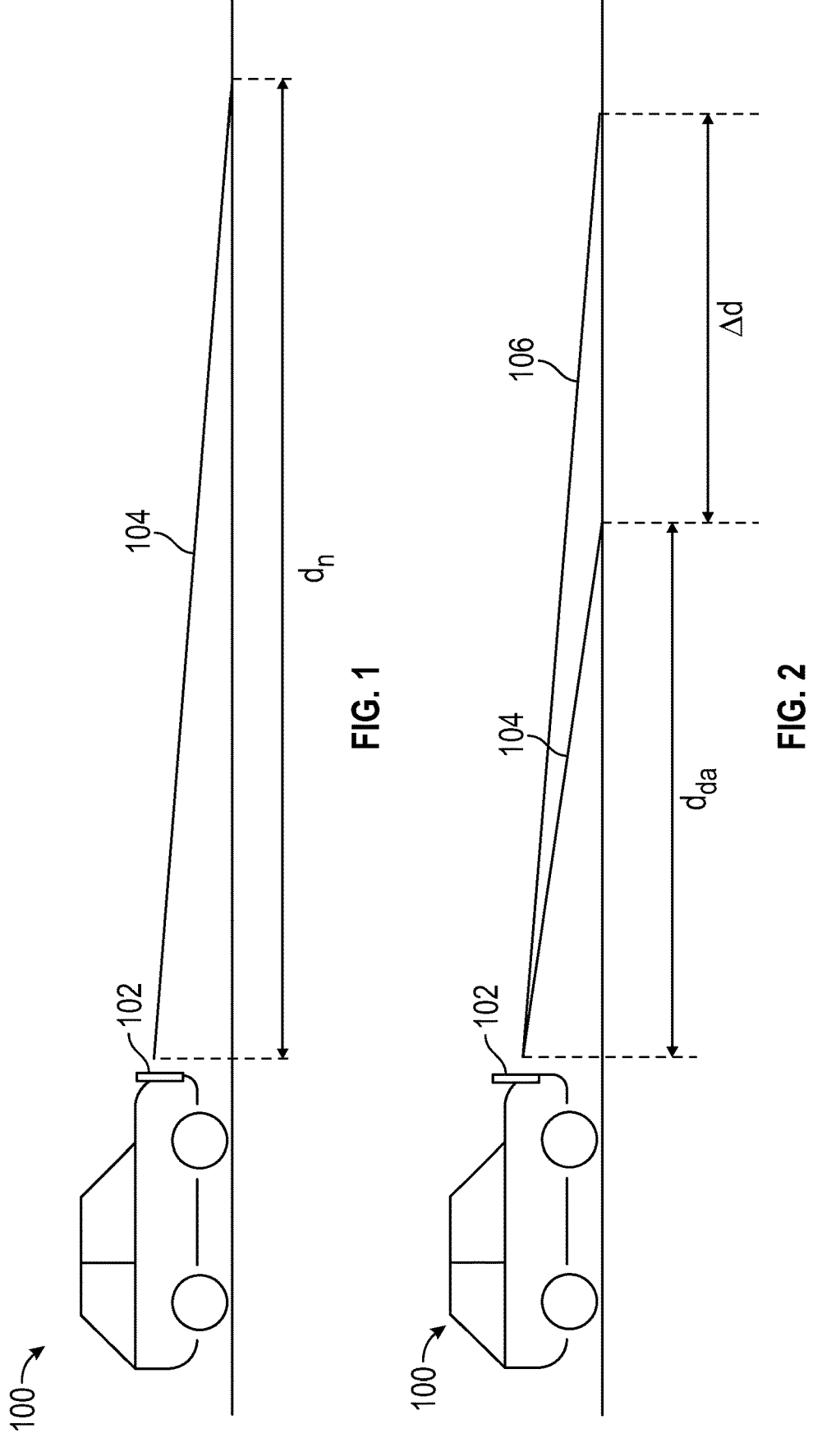
FIG. 1 shows a host vehicle in a side view, in accordance with an exemplary embodiment.
FIG. 2 shows the host vehicle in a side view operating in a down aim mode.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a host vehicle 100 in a side view. The host vehicle 100 includes a headlight 102 placed at a selected location and height. In various embodiments, the headlight 102 is placed high on the host vehicle 100, such as at a vertical distance of around 50 inches above the surface or ground. The headlight 102 includes a low beam light and a high beam light. The low beam light can be an individual light or an array of light sources. The high beam light can be an array of pixels which can selectively illuminate the space in front of the host vehicle 100. The headlight 102 can operate in at least a low beam mode and a down aim mode. As shown in FIG. 1, the headlight 102 is operating in a low beam mode. In the low beam mode, a beam of light 104 is generated by the low beam pixels while the high beam pixels are turned off. The headlight 102 can have an angle of declension with respect to a horizon. The beam of light 104 extends a nominal road distance $d_n$ in front of the vehicle. For illustrative purposes only, the nominal road distance is about 90 meters.

FIG. 2 shows the host vehicle 100 in a side view operating in a down aim mode. In the down aim mode, the headlight 102 is rotated along a horizontal axis to increase the angle of declension of the beam of light 104. As a result, the beam of light 104 generated by the low beam pixels extends a "down aim" road distance $d_{da}$ in front of the host vehicle 100. The "down aim" road distance $d_{da}$ is less than the nominal road distance $d_n$. For illustrative purposes, the "down aim" road distance $d_{da}$ is about 50 meters. Thus, there is a remaining road distance $\Delta d$ between about 50 meters and about 90 meters that is no longer illuminated by the low beam pixels when the headlight 102 is in the down aim mode. In the down aim mode, the high beam pixels of the headlight 102 can be turned on to illuminate this remaining road distance $\Delta d$, as discussed herein.

Figure 3:
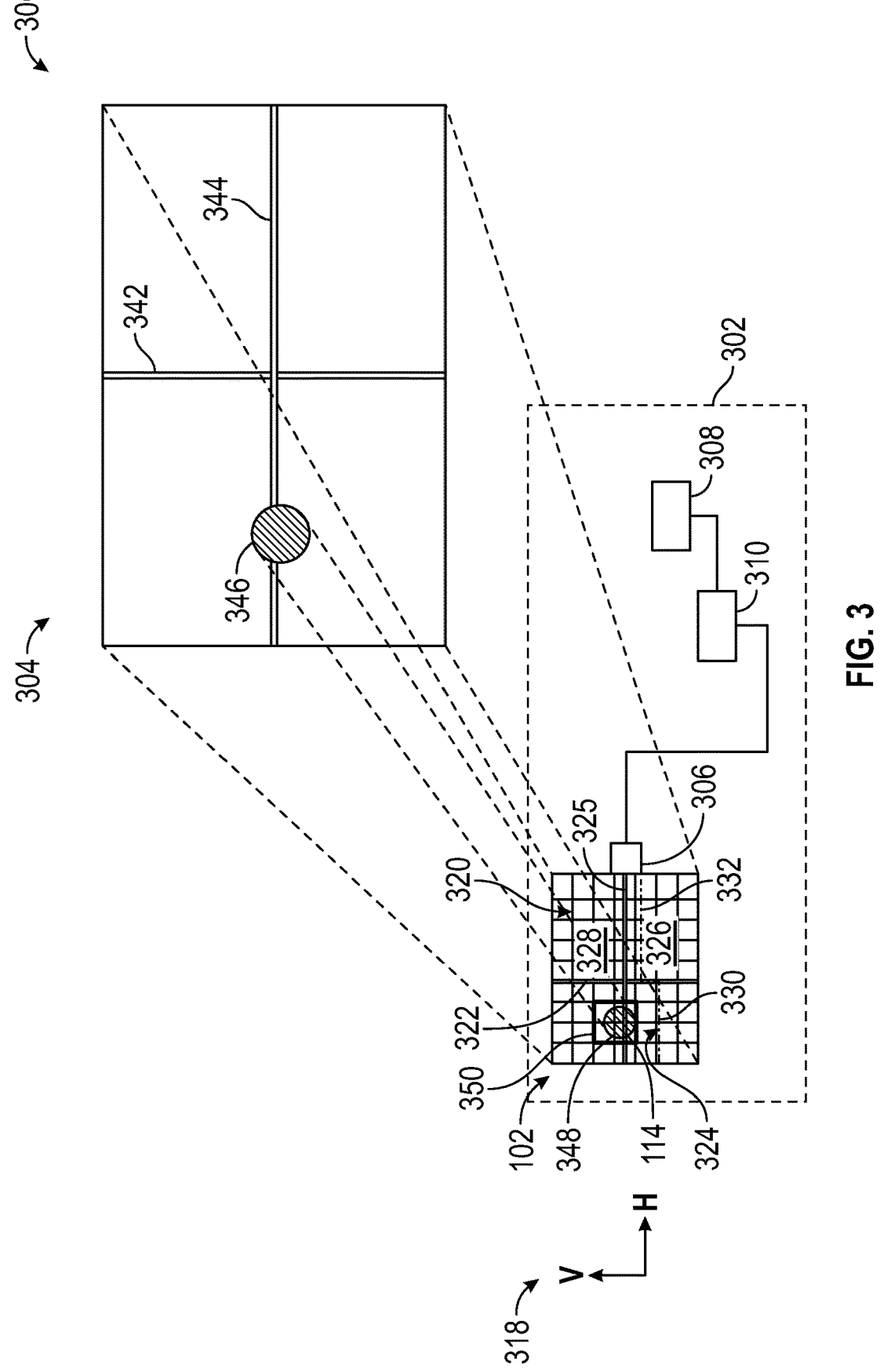
FIG. 3 is a schematic diagram illustrating a headlight system for the host vehicle and an illumination area associated with the headlight.

FIG. 3 is a schematic diagram 300 illustrating a headlight system 302 for the host vehicle 100 and an illumination area 304 associated with the headlight 102. The headlight system 302 includes the headlight 102 and an actuator 306 for changing an orientation of the headlight. The actuator 306 is able to rotate the headlight 102 about a horizontal axis to change an angle of declension of the headlight between the "low beam" mode (smaller angle of declension) and a down aim mode (greater angle of declension). The headlight system 302 further includes a sensor 308 that senses the location of remote objects. The sensor 308 can be a digital camera, radar, Lidar or other sensing device. The sensor 308 can be a separate device from the headlight 102 or can be integrated into the headlight. The sensor 308 and the headlight 102 are in communication with a controller 310.

The controller 310 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 310 may also include a non-transitory computer-readable medium that stores instructions which are processed by one or more processors of the controller to implement processes detailed herein.

In various embodiments, data (e.g., an image) from the sensor 308 is sent to the controller 310. The controller 310 determines a location and size of a remote object based on the data and controls an operation of the headlight 102 and/or the actuator 306 based on the data, as discussed herein.

The headlight 102 includes an array 320 of pixels or light sources, such as light emitting diodes (LEDs). A coordinate system 318 of the array defines a horizontal axis (H) and a vertical axis (V). A traffic division line 322 is a vertical line that separates the array 320 into a left-side and a right-side. Light from pixels within the left-side of the array 320 tends to be directed into an on-coming lane while light from pixels within the right side of the array tend to be directed into a same lane as the host vehicle 100. A horizontal location of the traffic division line 322 can be a programmable value.

The array 320 includes low beam pixels and high beam pixels. The low beam pixels are designated for operating as low beam pixels. The high beam pixels generally operate as high beam pixels but can also operate as a low beam pixel when instructed by the controller 310. A low beam cutoff 324 designates a low beam region 326 and a high beam region 328. Pixels within the low beam region 326 includes those pixels that are designated as low beam pixels as well as pixels that are high beam pixels currently operating as low beam pixels. The high beam region 328 includes high beam pixels. A height of the low beam cutoff 324 is a programmable value and can be raised and lowered by the controller 310. The height of the low beam cutoff 324 is a result of the orientation of the low beam light(s). The height of the low beam cutoff 324 depends on which side of the traffic division line 322 it is on. The low beam cutoff 324 includes a first cutoff line 330 on the left side of the traffic division line 322 and a second cutoff line 332 on the right side of the traffic division line. The first cutoff line 330 is generally lower than the second cutoff line 332. This is due to the glare considerations for on-coming traffic.

It is noted that, depending on the country, the on-coming traffic can be on either the right side or left side of the traffic division line 322. Therefore, the heights of the first cutoff line 330 and the second cutoff line 332 can be selected to suit the traffic lane protocol of the country.

Light from the headlight 102 is projected into the illumination area 304. The illumination area 304 is shown at a given distance from the headlight 102. However, it is understood that the illumination area 304 can include the entire volume between the illumination area 304 shown in FIG. 3 and the headlight 102.

A divider 342 separates the on-coming lane from the current lane of the host vehicle. The location of the traffic division line 322 in the array 320 corresponds to the divider 342. The divider 342 can be determined from an image of the illumination area 304 obtained from the sensor 308. Additionally, a horizon 344 is shown in the illumination area 304. A horizon line 325 corresponding to the horizon 344 is shown in the array 320. The location of the horizon line 325 can be determined by the controller 310 from the location of the horizon 344 in an image of the illumination area 304 taken by the sensor 308.

An object 346 is shown in the illumination area 304 for illustrative purposes. The object 346 can be another road user, such as an on-coming vehicle in an on-coming lane, a co-moving vehicle ahead of the host vehicle in the same lane, a pedestrian, bicyclist, etc. A projection 348 corresponding to the object 346 is shown in the array 320. Light emitted from within the projection 348 produces glare at the object 346. One way of preventing glare at the object 346 therefore includes turning off any pixel for which a portion of the pixel lies within the projection 348. Examples of glare-producing pixels 350 that have a portion within projection 348 are shaded for illustration. The controller 310 can determine a size and position of the projection 348 within the array 320 from an image taken of the illumination area 304 and the object 346 and can turn off the glare-producing pixels 350 as appropriate.

In non-limiting embodiments, the headlight 102 can be a single row adjustable headlight or a four-row adjustable headlight. A single row headlight includes a plurality of vertical pixels arranged in a row next to each other along the horizontal axis of the array. Each vertical pixel spans the entire height from the top of the array to the bottom of the array. On a four-row headlight, each column of the array is divided into a vertical pixel and three single row pixels stacked vertically. The single row pixels take the bottom array locations in the column and the vertical pixel spans from the top of the array to the top single-row pixels. Operation of a single row adjustable headlight is discussed herein with respect to FIGS. 4-8. Operation of the four-row adjustable headlight is discussed herein with respect to FIGS. 9-13.

Figure 4:
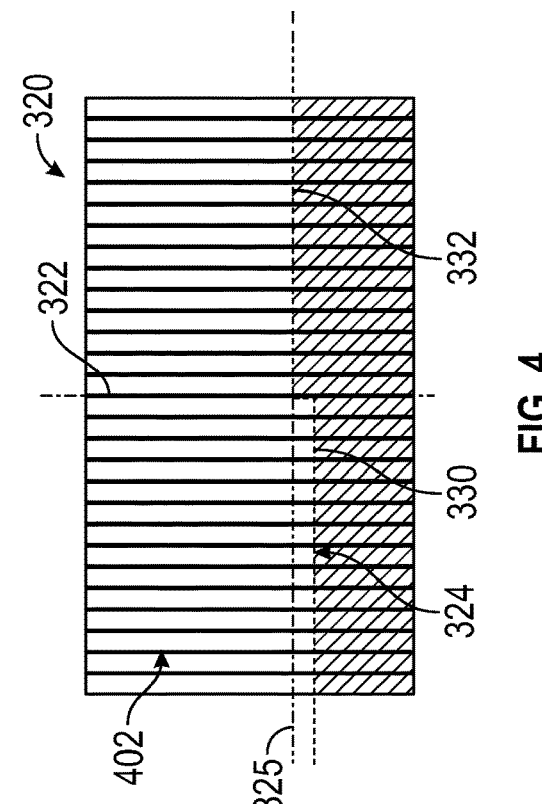
FIG. 4 shows a pixel map of the array for a single row headlight operating in a low beam mode.

FIG. 4 shows a pixel map 400 of the array 320 for a single row headlight operating in a low beam mode. The array 320 includes high beam pixels 402 which extend from the top of the array to the bottom of the array. The high beam pixels 402 extend across the low beam cutoff 324 into a region illuminated by the low beam pixels. The low beam cutoff 324 is shown with respect to the horizon line 325. The first cutoff line 330 is below the horizon line 325 by one pixel row and the second cutoff line 332 along the horizon line 325.

Figure 5:
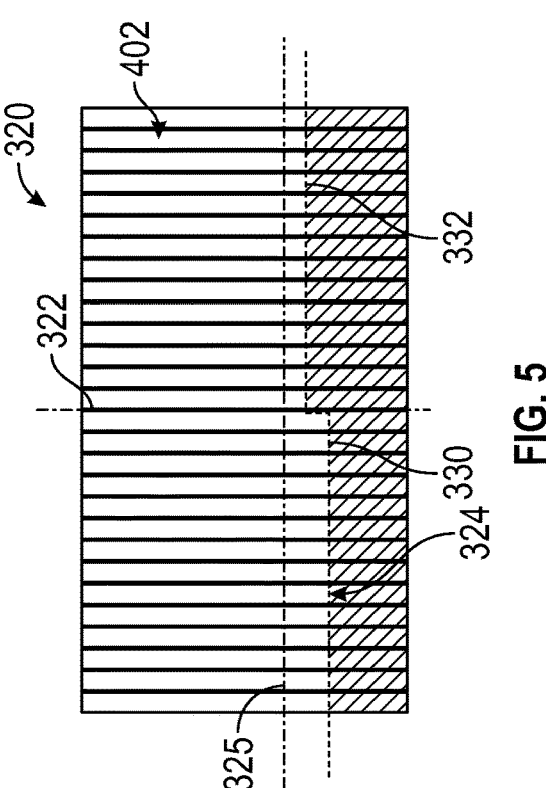
FIG. 5 shows a pixel map of the array for the single row headlight operating in a down aim mode.

FIG. 5 shows a pixel map 500 of the array 320 for the single row headlight operating in a down aim mode. The low beam cutoff 324 has been lowered by a pre-determined amount with respect to the horizon line 325. The low beam cutoff 324 can be lowered by rotating the headlight 102.

Figure 6:
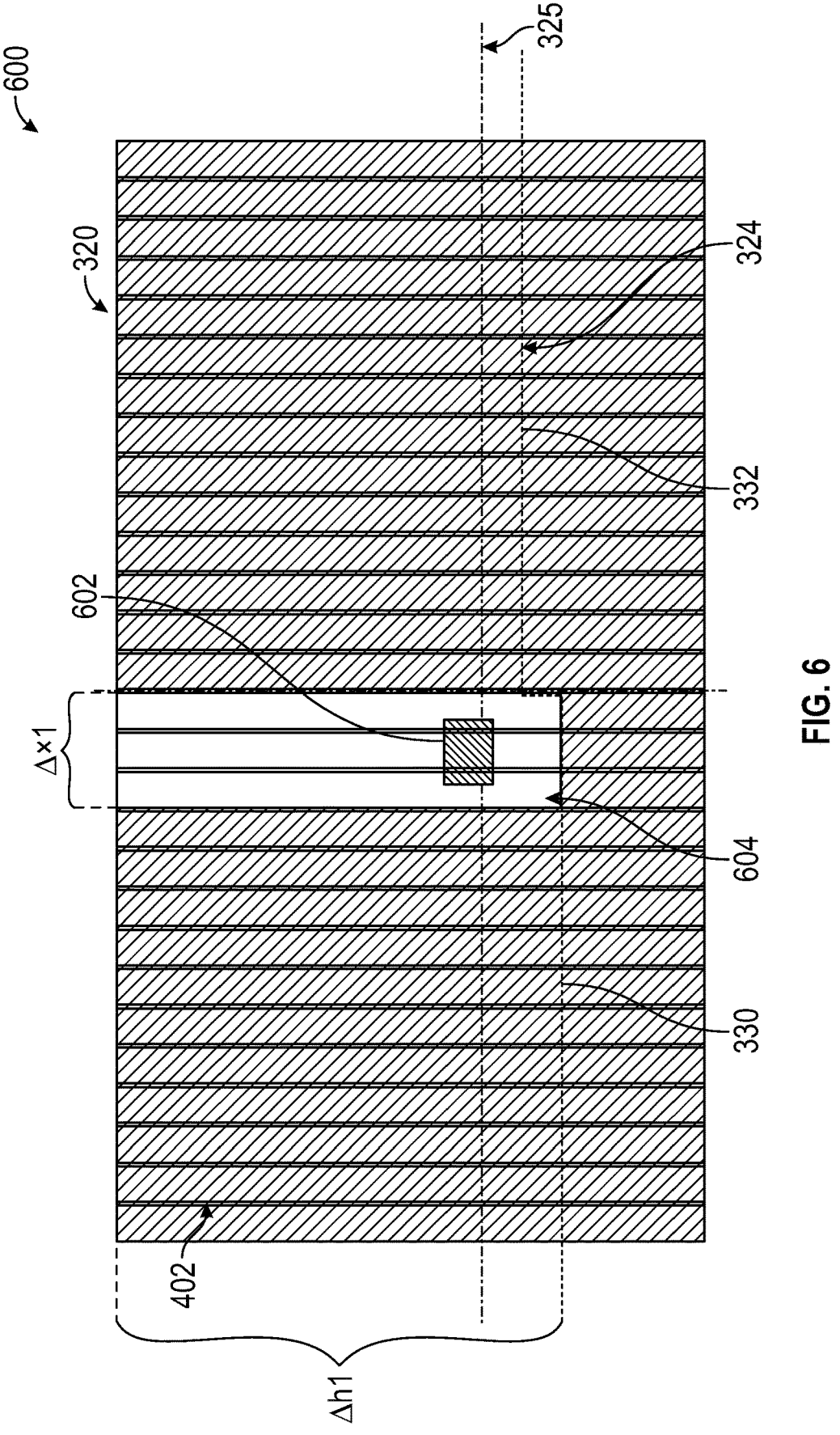
FIG. 6 shows a pixel map of the array for the single row headlight in a down aim mode with an object at a far distance.

FIG. 6 shows a pixel map 600 of the array 320 for the single row headlight in a down aim mode with an object at a far distance. The distance to the object is outside of the down aim distance $d_{da}$ (e.g., greater than about 50 meters). A projection 602 of the object appears in the left hand side of the array 320. The location and size of the projection 602 is related to the size of the object and the distance between the object and the headlight 102. The controller 310 determines the location and size of the projection and creates a non-glare region 604 that envelops the projection 602. The non-glare region 604 includes a column (or a plurality of adjacent columns) of high-beam pixels that cover or envelope the projection 602. High beam pixels within the non-glare region 604 are turned off to prevent any glare from occurring at the object. The lateral extent $\Delta x_1$ of the non-glare region 604 is greater than or equal to the lateral dimension of the projection 602. The height $\Delta h$ of the non-glare region 604 extends from the top of the array to the low beam cutoff 324.

Figure 7:
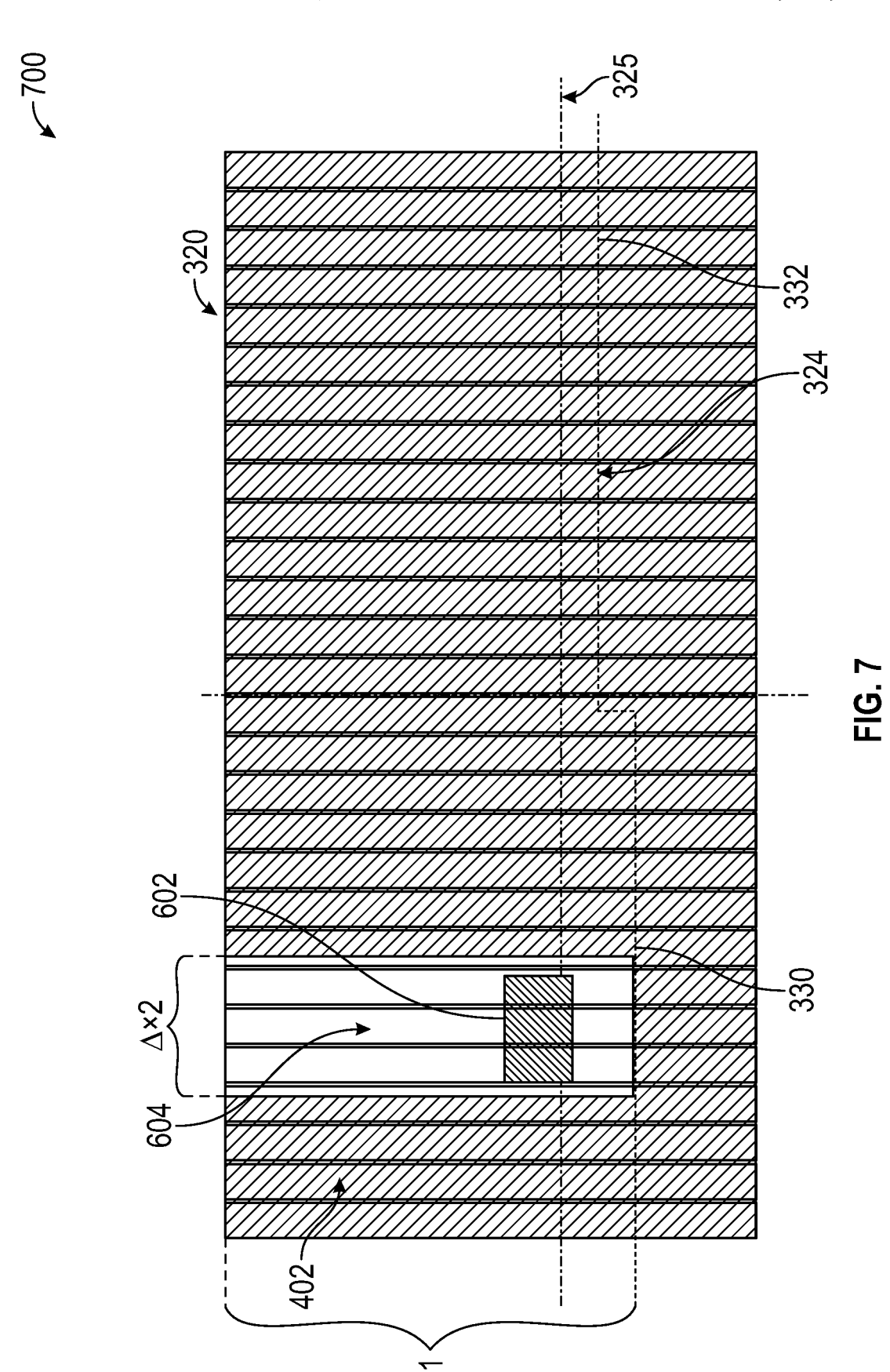
FIG. 7 shows a pixel map of the array of the single row headlight in a down aim mode with the object at a near distance.

FIG. 7 shows a pixel map 700 of the array 320 of the single row headlight in a down aim mode with the object at a near distance. The distance to the object is inside the down aim distance $d_{da}$ (e.g., less than about 50 meters). As the object approaches the host vehicle, its projection 602 moves left-ward and upward with respect to the horizon and increases in size. Since the object is being tracked over multiple camera images as its moves with respect to the host vehicle 100, the non-glare region 604 can be recalculated on a periodic basis (e.g., every 0.2 seconds to follow the projection 602 across the array 320. The height $\Delta h$ of non-glare region 604 when the object is at the near distance is the same as the height when the object is at the far distance, because the distance between the top of the array and the low beam cutoff 324 does not change. However, the lateral extent $\Delta x_2$ of the non-glare region 604 has increased as the object has moved near to the vehicle.

Figure 8:
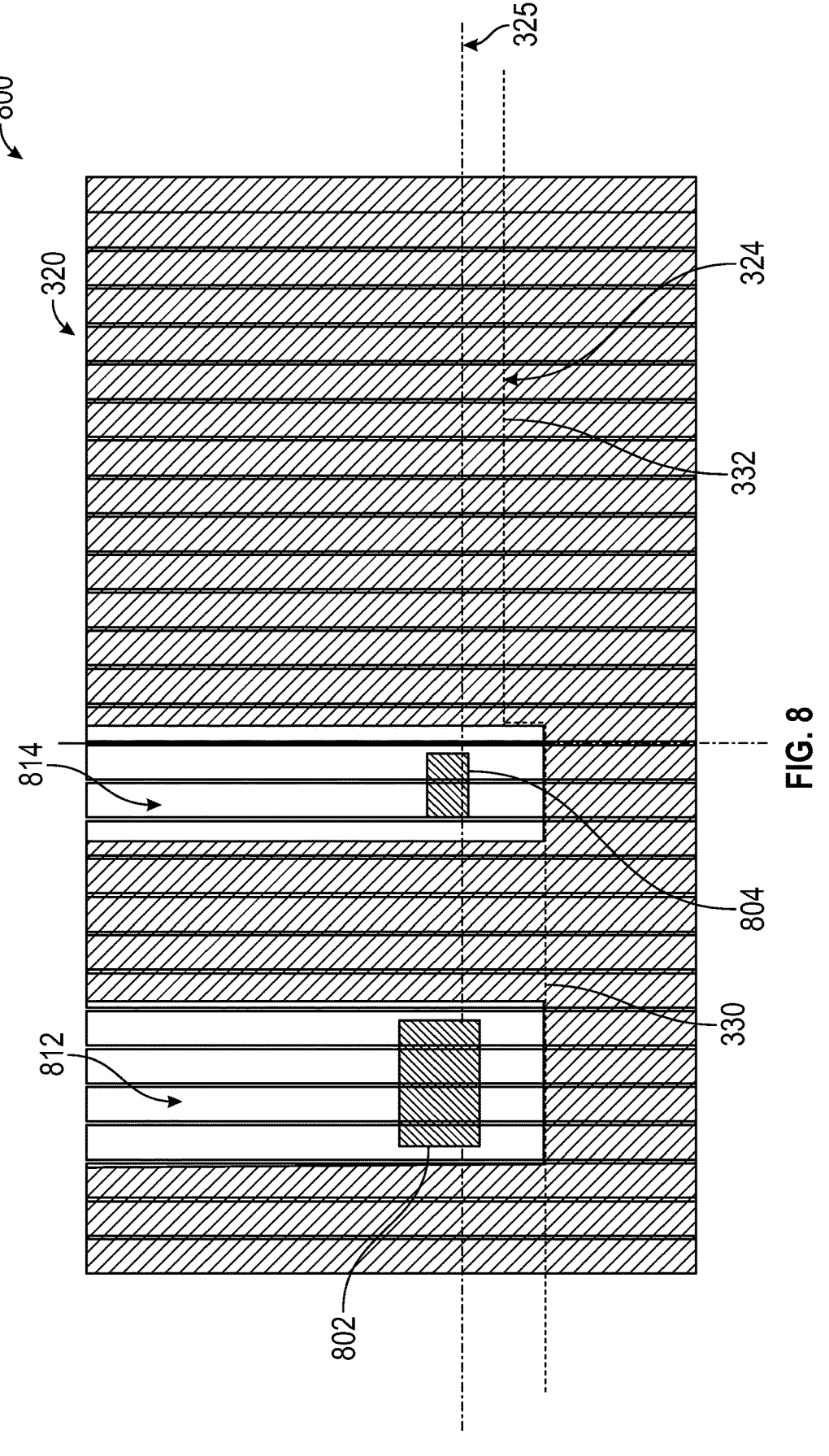
FIG. 8 shows a pixel map of the array of the single row headlight operating in the presence of multiple objects.

FIG. 8 shows a pixel map 800 of the array 320 of the single row headlight operating in the presence of multiple objects. A first projection 802 of a first object and a second projection 804 of a second object are shown within the array 320. The distance to the first object is less than the down aim distance $d_{da}$ while the distance to the second object is greater than the down aim distance $d_{da}$. Each object is tracking individually. Thus, a first non-glare region 812 is formed to envelope the first projection 802 based on the location and dimensions of the first projection and a second non-glare region 814 is formed to envelope the second projection 804 based on the location and dimensions of the second projection.

Figures 9, 10:
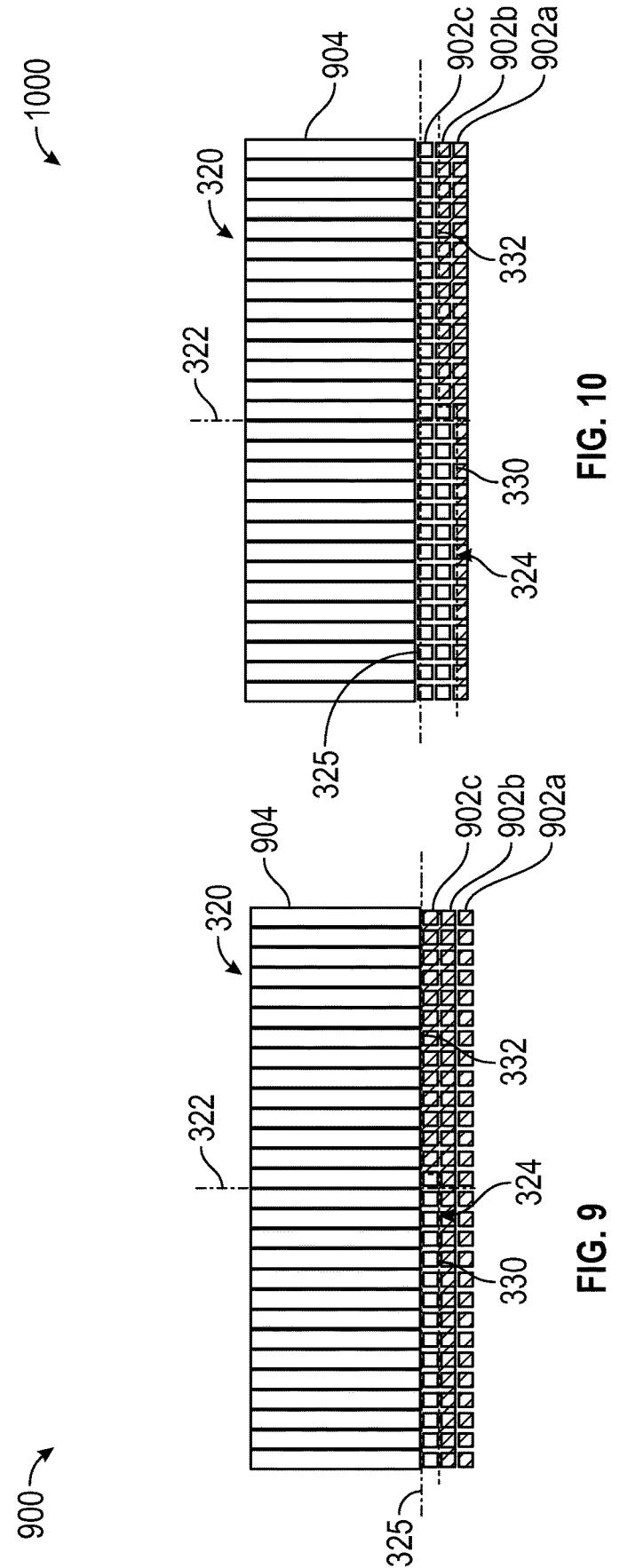
FIG. 9 shows a pixel map of the array for a four-row headlight operating in a low beam mode.
FIG. 10 shows a pixel map of the array for the four-row headlight operating in a down aim mode.

FIG. 9 shows a pixel map 900 of the array 320 for a four-row headlight operating in a low beam mode. The array 320 includes three rows of single-row pixels (902a, 902b, 902c) and a vertical pixel 904 on top of each column of single-row pixels. The single-row pixels 902a, 902b, 902c can be turned off and on independently, as instructed by the controller 310. The low beam cutoff 324 is shown with respect to the horizon line 325. The first cutoff line 330 is below the horizon line 325 by one pixel row (underneath single-row pixel 902c) and the second cutoff line 332 is along the horizon line (underneath vertical pixel 904).

FIG. 10 shows a pixel map 1000 of the array 320 for the four-row headlight operating in a down aim mode. For illustrative purposes only, the low beam cutoff 324 has been moved down by one row with respect to the horizon line 325. In other embodiments, the low beam cutoff 324 can be moved by any selected amount. The low beam cutoff 324 can be lowered either by rotating the headlight 102 using the actuator 306 or by reassigning one or more high beam pixels to operate as low beam pixels.

Figure 11:
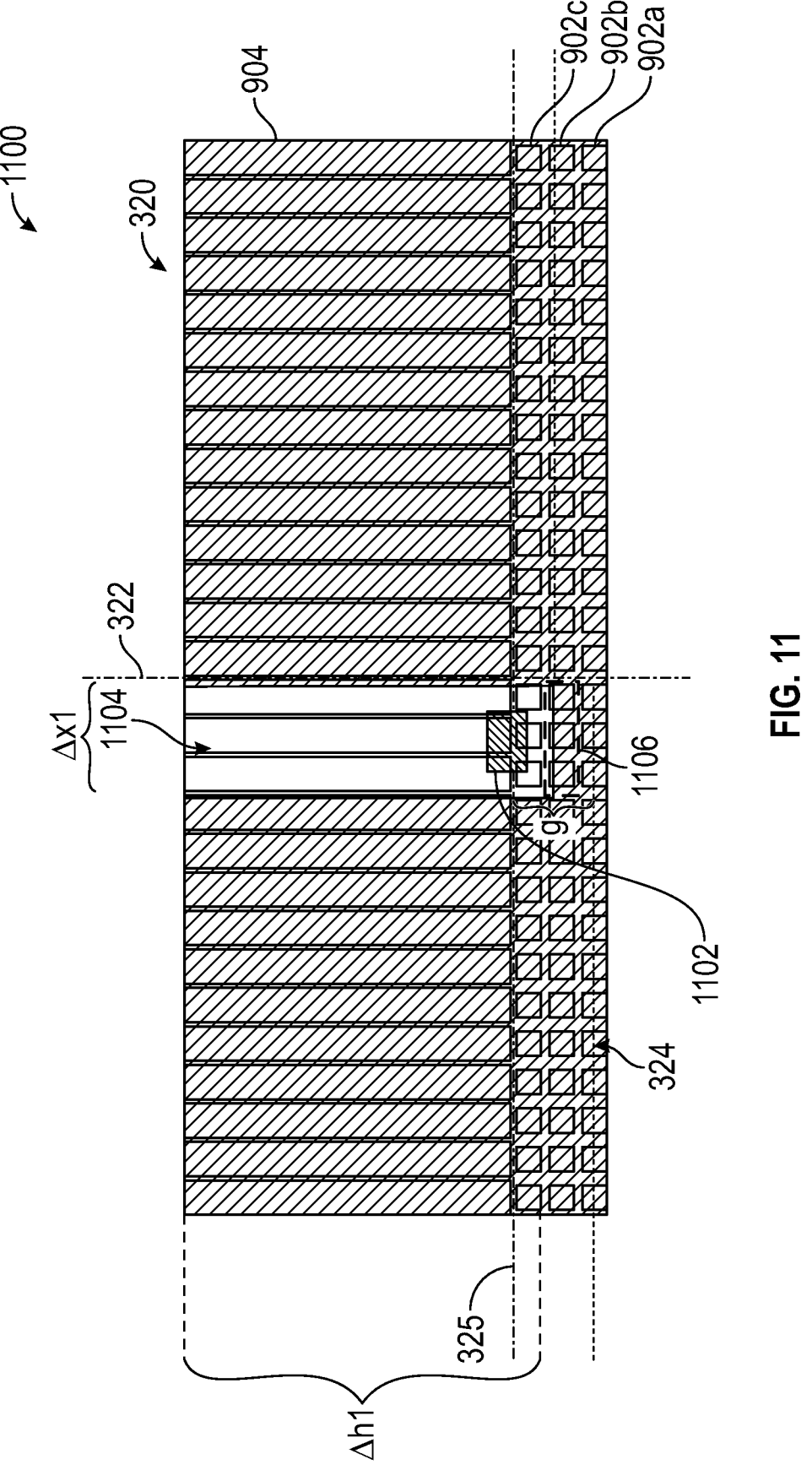
FIG. 11 shows a pixel map for an array for the four-row headlight operating in the presence of an object at a far distance from the vehicle.

FIG. 11 shows a pixel map 1100 for an array 320 for the four-row headlight operating in the presence of an object at a far distance from the vehicle. The distance to the object is greater than the down-beam limit of the headlight. (i.e., greater than about 50 meters). A projection 1102 of the object is shown in the left hand side of the array 320. The low beam cutoff 324 is lowered, if necessary. A non-glare region 1104 is created to envelope the projection 1102 based on a lateral position of the projection in the array 320 and a size or dimension of the projection.

The non-glare region 1104 includes a column (or plurality of adjacent columns) of the high-beam pixels that cover the projection 1102. High beam pixels within the non-glare region 1104 are turned off to prevent any glare from occurring at the object. The lateral extent $\Delta x1$ of the non-glare region 1104 is greater than or equal to the lateral dimension of the projection 602. The height $\Delta h1$ of the non-glare region 1104 extends from the top of the array to a selected vertical location which can be, but is not necessarily, the low beam cutoff 324.

The sensor system determines the distance of the object. The controller 310 can turn back on gap pixels 1106 that are within the gap g, that would not produce glare at the object within the remaining road distance $\Delta d$. For the purposes of illustration, the gap pixels 1106 includes a single-row pixel within the third row from the bottom. Single row pixels within the bottom row and second row up are not within the gap g and are therefore kept off. Alternatively, the gap pixels 1106 can remain turned on while the other pixels of the non-glare region 1104 are turned off.

Figure 12:
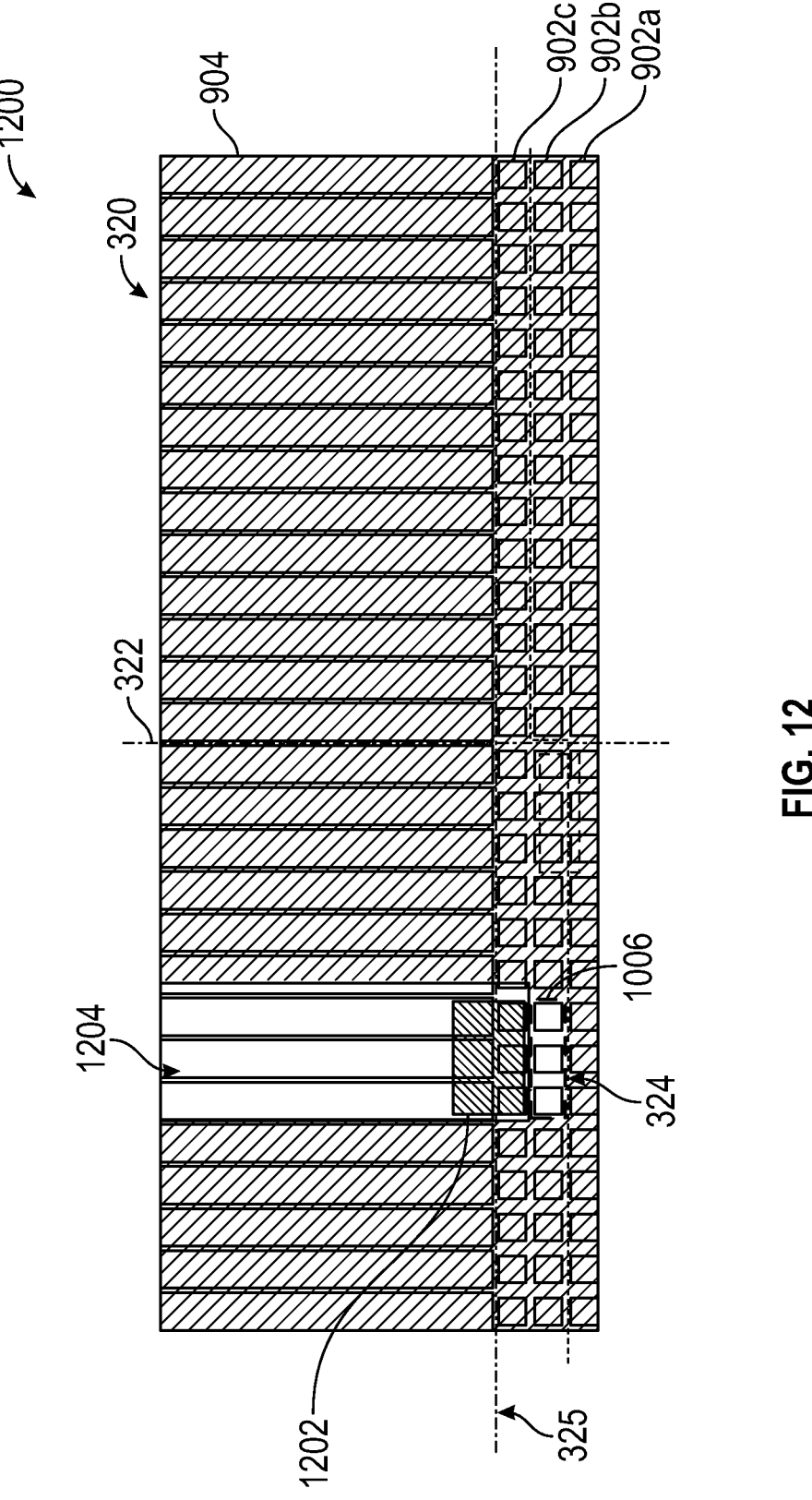
FIG. 12 shows a pixel map for the array of a four-row headlight operating with respect to the object at a near distance.

FIG. 12 shows a pixel map 1200 for the array 320 of a four-row headlight operating with a respect to the object at a near distance. The distance to the object is inside the down aim distance $d_{da}$ (e.g., less than about 50 meters). At the object at the near distance, the height $\Delta h2$ of the non-glare region 1104 is increased. The gap pixels 1106 are turned back off as the object approaches within the down aim distance $d_{da}$.

As shown in FIGS. 11 and 12, the state of the pixels within the vertical gap g can change as the object approaches the host vehicle 100. When the object is at a far distance, the effects of glare at the object are reduced. Thus, the controller 310 can take advantage of this reduced glare by turning on the gap pixels 1106, thereby increasing an illuminated distance in the direction of the object. When the object is at a near distance, the effects of glare are increased. Thus, the controller 310 can elect to keep the gap pixels 1106 off to allow reducing of glare at the object.

Figure 13:
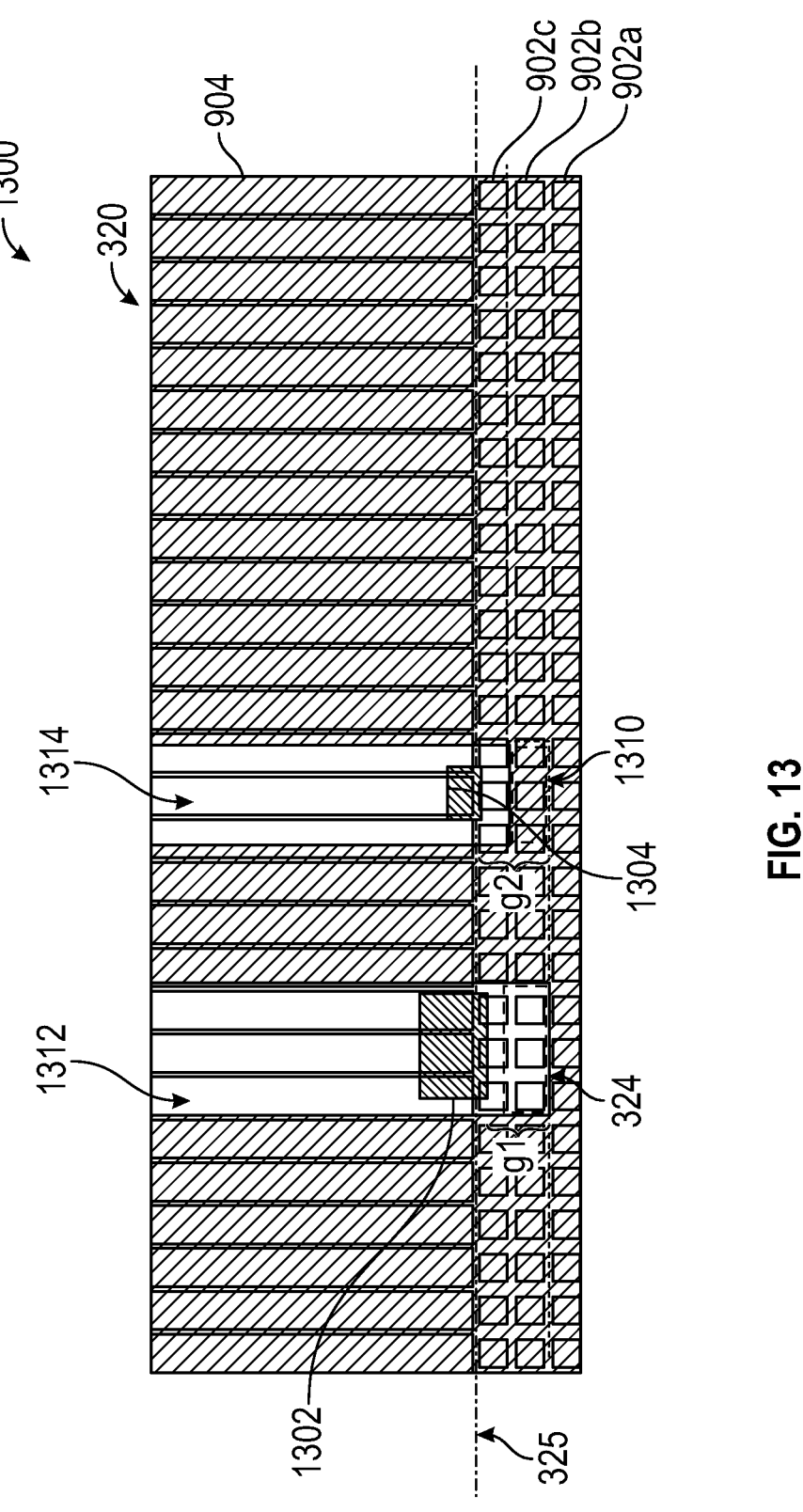
FIG. 13 shows a pixel map of the array in the presence of multiple objects.

FIG. 13 shows a pixel map 1300 of the array 320 in the presence of multiple objects. A first projection 1302 of a first object and a second projection 1304 of a second object are shown within the array 320. The distance to the first object is less than the down aim distance $d_{da}$ while the distance to the second object is greater than the down aim distance $d_{da}$. Each object is tracked individually. Thus, a first non-glare region 1312 is formed to envelope the first projection 1302 based on the location and dimensions of the first projection. Since the first object is near, the pixels within the first vertical gap $g_1$ are not turned on. A second non-glare region 1314 is formed to envelope the second projection 1304 based on the location and dimensions of the second projection. Since the first object is far away, the pixels 1310 within the second vertical gap $g_2$ are turned on. Thus, the height (as well as the lateral extent) of the first non-glare region 1312 and second non-glare region 1314 can change as the distance between the host vehicle 100 and object changes.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a headlight of a vehicle, comprising:
   obtaining an image of an object via a sensor;
   determining, via a processor, a projection of the object within the headlight, wherein the headlight includes an array of pixels and a low beam cutoff separating the array into a high beam region and a low beam region;
   identifying, via the processor, a pixel having a portion thereof within the projection;
   adjusting a height of the low beam cutoff to place the projection above the low beam cutoff; and
   turning off the pixel, via the processor, to reduce glare from the headlight at the object.

2. The method of claim 1, wherein adjusting the height of the low beam cutoff further comprises rotating the headlight along an axis.

3. The method of claim 1, wherein turning off the pixel further comprises turning off a vertical pixel and a single-row pixel at a same lateral position of the headlight as the projection.

4. The method of claim 3, further comprising determining a vertical gap between a bottom of the projection and a low beam cutoff and turning on the single-row pixel within the vertical gap.

5. The method of claim 4, further comprising turning on the single-row pixel within the vertical gap when a distance between the object and the vehicle is greater than a down aim road distance of the headlight and turning off the single-row pixel within the vertical gap when the distance is less than the down aim road distance.

6. The method of claim 1, wherein the object comprises a first object and a second object, further comprising determining a first projection for the first object and a second projection for the second object, turning off a first pixel to produce a first non-glare region for the first projection and turning off a second pixel to produce a second non-glare region for the second projection.

7. The method of claim 1, wherein the sensor is one of: (i) a separate device from the headlight; and (ii) integrated into the headlight.

8. A headlight system for a vehicle, comprising:
a sensor configured to obtain an image of an object;
a processor configured to:
    determine a projection of the object within a headlight, wherein the headlight includes an array of pixels and a low beam cutoff separating the array into a high beam region and a low beam region;
    identify a pixel having a portion thereof within the projection;
    adjust a height of the low beam cutoff to place the projection above the low beam cutoff; and
    turn off the pixel to reduce glare from the headlight at the object.

9. The headlight system of claim 8, wherein the processor is further configured to adjust the height of the low beam cutoff by rotating the headlight along an axis.

10. The headlight system of claim 8, wherein the processor is further configured to turn off a vertical pixel and a single-row pixel at a same lateral position of the headlight as the projection.

11. The headlight system of claim 10, wherein the processor is further configured to determine a vertical gap between a bottom of the projection and a low beam cutoff and turn on the single-row pixel within the vertical gap.

12. The headlight system of claim 11, wherein the processor is further configured to turn on the single-row pixel within the vertical gap when a distance between the object and the vehicle is greater than a down aim road distance of the headlight and turn off the single-row pixel within the vertical gap when the distance is less than the down aim road distance.

13. The headlight system of claim 8, wherein the object comprises a first object and a second object and the processor is further configured to determine a first projection for the first object and a second projection for the second object, turn off a first pixel to produce a first non-glare region for the first projection and turn off a second pixel to produce a second non-glare region for the second projection.

14. The headlight system of claim 8, wherein the sensor is one of: (i) a separate device from the headlight; and (ii) integrated into the headlight.

15. A vehicle, comprising:
a headlight;
a sensor configured to obtain an image of an object;
a processor configured to:
    determine a projection of the object within the headlight, wherein the headlight includes an array of pixels and a low beam cutoff separating the array into a high beam region and a low beam region;
    identify a pixel having a portion thereof within the projection;
    adjust a height of the low beam cutoff to place the projection above the low beam cutoff; and
    turn off the pixel to reduce glare from the headlight at the object.

16. The vehicle of claim 15, wherein the processor is further configured to adjust the height of the low beam cutoff by rotating the headlight along an axis.

17. The vehicle of claim 15, wherein the processor is further configured to turn off a vertical pixel and a single-row pixel at a same lateral position of the headlight as the projection.

18. The vehicle of claim 17, wherein the processor is further configured to determine a vertical gap between a bottom of the projection and a low beam cutoff and turn on the single-row pixel within the vertical gap when a distance between the object and the vehicle is greater than a down aim road distance of the headlight.

19. The vehicle of claim 15, wherein the object comprises a first object and a second object and the processor is further configured to determine a first projection for the first object and a second projection for the second object, turn off a first pixel to produce a first non-glare region for the first projection and turn off a second pixel to produce a second non-glare region for the second projection.

20. The vehicle of claim 15, wherein the sensor is one of: (i) a separate device from the headlight; and (ii) integrated into the headlight.

* * * * *